(12) United States Patent
Zhu et al.

(10) Patent No.: US 8,718,080 B2
(45) Date of Patent: May 6, 2014

(54) TECHNIQUES FOR QUICK ACCESS CHANNEL INFORMATION LOADING IN WIRELESS NETWORKS

(75) Inventors: Yuan Zhu, Beijing (CN); Xiangying Yang, Portland, OR (US); Qinghua Li, San Ramon, CA (US); Hujun Yin, Saratoga, CA (US); Honggang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 336 days.

(21) Appl. No.: 13/301,169

(22) Filed: Nov. 21, 2011

(65) Prior Publication Data

US 2012/0063442 A1     Mar. 15, 2012

Related U.S. Application Data

(63) Continuation of application No. 12/378,390, filed on Feb. 13, 2009, now Pat. No. 8,064,476.

(51) Int. Cl.
| | | |
|---|---|---|
| *H04J 3/16* | (2006.01) | |
| *H04J 1/16* | (2006.01) | |
| *H04J 3/14* | (2006.01) | |
| *H04J 3/22* | (2006.01) | |
| *H04J 3/18* | (2006.01) | |
| *H04B 7/00* | (2006.01) | |

(52) U.S. Cl.
USPC ........... 370/437; 370/252; 370/468; 370/477; 455/509; 455/515

(58) Field of Classification Search
USPC ................ 370/252, 430, 431, 437, 468, 477; 455/509, 515
See application file for complete search history.

(56) References Cited

U.S. PATENT DOCUMENTS

| 8,064,476 B2 | 11/2011 | Zhu et al. |
| 2007/0105508 A1 | 5/2007 | Tong et al. |
| 2007/0291719 A1 | 12/2007 | Demirhan et al. |
| 2008/0159334 A1 | 7/2008 | Venkatachalam et al. |
| 2008/0232401 A1 | 9/2008 | Ahmadi et al. |
| 2008/0233966 A1 | 9/2008 | Scheim et al. |

FOREIGN PATENT DOCUMENTS

| CN | 102273099 A | 12/2011 |
| EP | 2394375 A2 | 12/2011 |
| WO | 2010051516 A2 | 5/2010 |
| WO | 2010051516 A3 | 5/2010 |

OTHER PUBLICATIONS

International Search Report and Written Opinion received May 13, 2010, PCT Application Serial No. PCT/US2009/062902, 10 pages.

(Continued)

*Primary Examiner* — Ronald Abelson
(74) *Attorney, Agent, or Firm* — Thorpe North & Western, LLP

(57) ABSTRACT

An embodiment of the present invention provides a method of quick access channel information loading in wireless networks, comprising mapping at least one quick access channel to one distributed resource unit of control tiles, said control tiles being spread across consecutive sub-carriers and consecutive OFDMA symbols, wherein each control tile and a predetermined number of sub carriers are used to send a bandwidth indicator and a predetermined number of sub carriers are used to send a bandwidth request message, and wherein there exist unique orthogonal sequences for the bandwidth indicator and each of the sequences are capable of being selected as a preamble sequence.

28 Claims, 2 Drawing Sheets

(56) References Cited

OTHER PUBLICATIONS

International Preliminary Report on Patentability received May 12, 2011, PCT Application Serial No. PCT/US2009/062902, 5 pages.
Zhu et al., "Quick Access Channel (QACH) Design for IEEE 802.16m BW-REQ", IEEE C802.16m-08/1055r1, Sep. 12, 2008.
Li et al., "BW-REQ channel design recommendations for IEEE 802.16m", IEEE C802.16m-08/635, Jul. 13, 2008.
Office Action received for Chinese Patent Application No. 200980153567, mailed on Jun. 18, 2013 14 pages of Office Action Including 9 pages of English Translation.

TECHNIQUES FOR QUICK ACCESS CHANNEL INFORMATION LOADING IN WIRELESS NETWORKS

RELATED APPLICATION

This application is a continuation of U.S. patent application Ser. No. 12/378,390, filed on Feb. 13, 2009, entitled, "TECHNIQUES FOR QUICK ACCESS CHANNEL INFORMATION LOADING IN WIRELESS NETWORKS," which is herein incorporated by reference in its entirety.

BACKGROUND

In wireless communications systems, when schedule based access is used to allocate physical radio resources to mobile stations (MSs), the scheduler at the base station (BS) requires some critical information. For example, an uplink scheduler needs to know which MS needs PHY resources and how much and how urgent the MS needs the PHY resources. For another example, a downlink scheduler may need to know which modulation and code rate should be applied to the PHY resources for sending data to an MS. Such systems include present and future Institute for Electrical and Electronic Engineers (IEEE) 802.16e, LTE and 802.16m standards.

In the uplink (UL), one mechanism is needed for the MS to send to its serving BS both bandwidth request (BWREQ) indicators and BWREQ information to describe how the data should be scheduled to its serving BS. Previously, (e.g. IEEE802.16e or LTE) a MS sends the bandwidth indicator first and if the indicator is captured by the BS, in the next step the BS may grant PHY resources for the MS to send the bandwidth request. In LTE, an UL bandwidth request indicator (or schedule request in LTE terminology) is sent in a periodically allocated PHY resource (refer to as polling hereafter).

Polling has a major drawback when the bandwidth request rate is low. For example, in a typical Voice over Internet Protocol (VoIP) case, 0.4 BWREQ/user/second is needed to tell the BS a UL talk spurt starts. In order to meet the delay requirement within 5 ms, a MS needs to have one periodical PHY resource every 5 ms no matter if it has a bandwidth request to send or not. Another drawback is the large latency. Namely, the bandwidth request is sent after receiving a correct bandwidth indicator capture and successful PHY resources allocation for the bandwidth request.

Thus, a strong need exists for techniques for quick access channel information loading in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
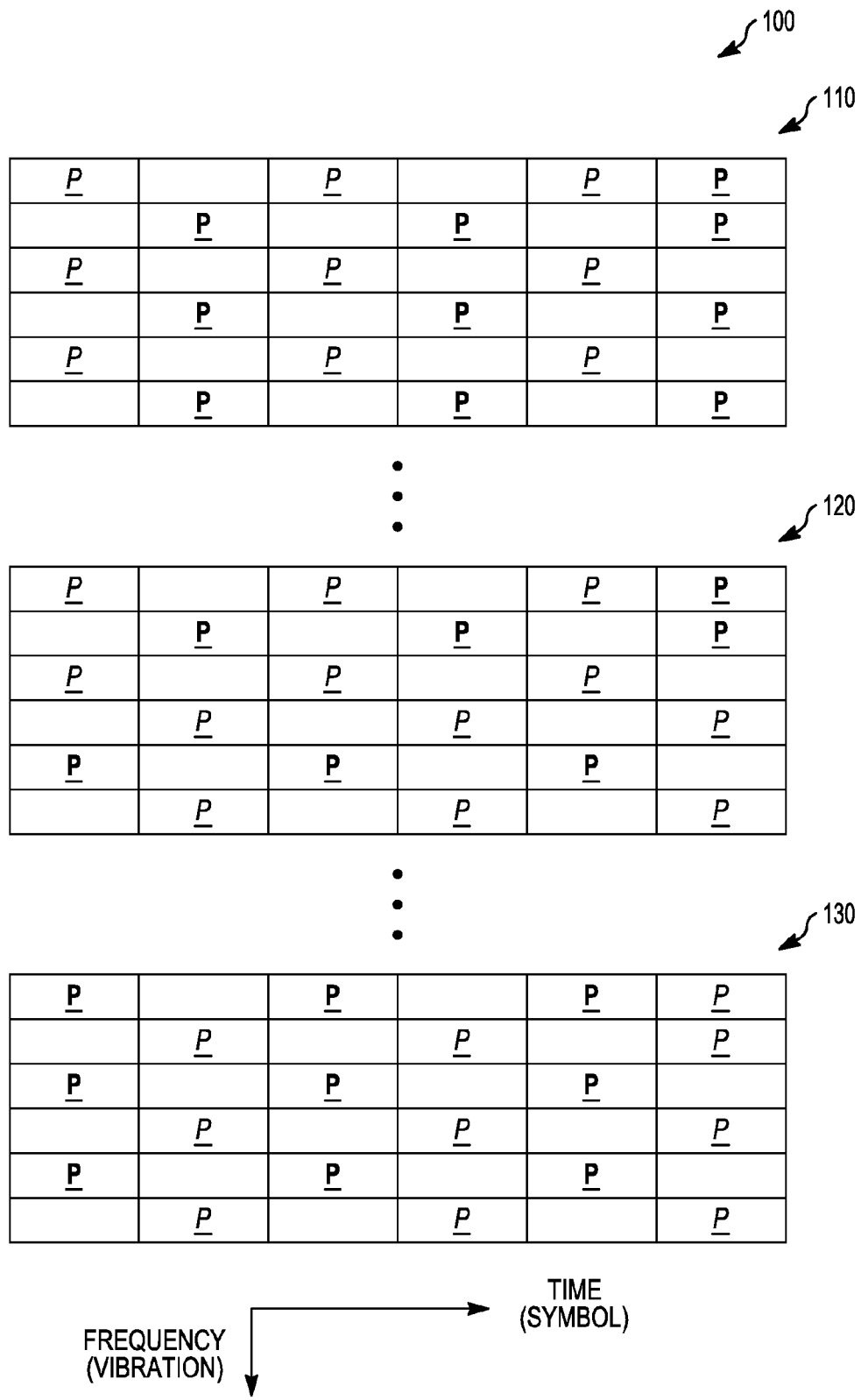
FIG. 1 depicts a quick access channel PHY structure according to an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide preamble sequence selection methods for quick channel access that can evenly distributed users among all sequences while also avoiding sequence collision. Embodiments of the present invention provide a quick 3-step access concept to IEEE802.16m, although the present invention is not limited in this respect. Embodiments of the present invention may be implemented as shown generally as 100 of FIG. 1 as follows:

1) One quick access channel will be mapped to one distributed resource unit that consists of three 6×6 control tiles 110, 120 and 130. The 6×6 tile spreads across 6 consecutive subcarriers and 6 consecutive OFDMA symbols.

2) Each 6×6 control tile 110, 120 and 130 and 19 sub carriers may be used to send bandwidth indicators and 17 sub carriers may be used to send bandwidth request messages.

3) There exist L (one example is 24) unique orthogonal sequences for the bandwidth indicator. Each of the L sequences may be selected as a preamble sequence.

4) The bandwidth message is able to carry N information bits. N is 12 by default, although the present invention is not limited to this.

5) In total, one bandwidth request channel is able to carry $L \times 2^N$ unique code words.

When quick access channel is used for bandwidth request purposes, both MS address and signaling bits will be mapped to the total available code words. Below defines the general framework of information element loading.

1) In total M users can be loaded to one channel, M full MAC Ids are $\{Id_0, Id_1, Id_2, \ldots, Id_{M-1}\}$;

2) One channel has K unique PHY address $\{Ar_0, Ar_1, Ar_2, \ldots, Ar_{K-1}\}$ M≤K;

3) One channel has L unique orthogonal sequence indexes $\{0, 1, 2, \ldots 18\}$;

4) Mapping from MAC Id to PHY address is unique for any given time t, t=0, 1, . . . ; and 5) At time t, one user can convey one code word out of J code words for signaling satisfying J×K=L×$2^N$ (i.e., the total effective information bits that one transmission coveys is N+$\log_2$(L) bits). It is noted that number of information code words to be loaded equals to number of information code words that could be conveyed by preamble and message.

When two MSs access the quick access channel at the same time and select the same preamble sequence, collision happens. Generally the information loading algorithm should distribute the sequence collision probability equally among all L sequences. In addition, the information loading algorithm should also ensure if two MSs select the same sequence for time t, the probability they select the same sequence for time t+1 is low. This prevents the sequence collision from repeating over time. If two MSs access the channel at the same time, the chance that both MSs select the same sequence should be designed to be up bounded by 1/L.

There are multiple methods to load the information to all available code words. Some examples are listed below, but the present invention is not limited to these examples.

The first method is described in this paragraph. If J=L×$2^O$, K=$2^P$, O+P=N, O≥0, P≥0, this method loads PHY address in message part and load signaling bits in preamble and message. If MS m wants to convey signaling code word j at time t, p=f(j, t) is the chosen preamble index, where p=0, 1, . . . 18. f(j, t) should be designed that the probability P{p=i} is close to 1/L for all users. And if two MSs $m_1$ and $m_2$ want to convey signaling code word $j_1$ and $j_2$ respectively at time t and the selected preamble sequence index is the same f($j_1$, t)=f($j_2$, t), we should minimize the possibility for f($j_1$, t+1)=f($j_2$, t+1). A possible drawback for this method is that f(j, t) can cause a collision increase if the J signaling code words are not equally distributed. This example proposes to group preamble sequences according to service class.

The second method is described in this paragraph. If J=$2^O$, K=L×$2^P$, O+P=N, O≥0, P≥0, this method loads PHY address in preamble and part of the message and load signaling bits in rest part of the message and if MS m wants to convey signaling CW j at time t p=h(m, t) is the chosen preamble index, where p=0, 1, . . . L−1. h(m, t) has a much easier design compared with case 1 in order to make P{p=i} close to 1/L for all users and if two users $m_1$ and $m_2$, h(m1, t)=h(m2, t), we should minimize the possibility h($m_1$, t+1)=h($m_2$, t+1). A drawback for this method is that BS may need to perform exhaustive search, i.e., calculating h(m, t), among for all possible m values at a given time t, and look up the unique valid m value or determine a collision when multiple m values generate the same output.

The third method is described in this paragraph. The third method loads PHY address in message and load signaling bits in preamble and message. We will choose preamble index by both signaling bits and PHY address. If J=L×$2^O$, K=$2^P$, O+P=N, O≥0, P≥0, if user m wants to convey signaling CW j at time t. p=f(m, j, t) is the chosen preamble index, where p=0, 1, . . . L−1. f(m, j, t) is designed to make P{p=i} close to 1/L for all users and if for two users $m_1$ and $m_2$, f($m_1$, $j_1$, t)=f($m_2$, $j_2$, t), we should minimize the possibility f($m_1$, $j_1$, t+1)=f($m_2$, $j_2$, t+1).

The third method can be viewed as a hybrid method for method 1 and method 2, the collision probability is better than method 1 but worse than method 2, but BS doesn't need to calculate all h(m,t) as in method 2. In addition, since PHY address will be known before signaling message is fully decoded from preamble and msg, the BS and the MS can use additional synchronized state information shared between them as input to function f( ) to enhance the randomness of its outputs. One example of such state information is the security context. Another example is the history of output p previously successfully processed.

Figure 2:
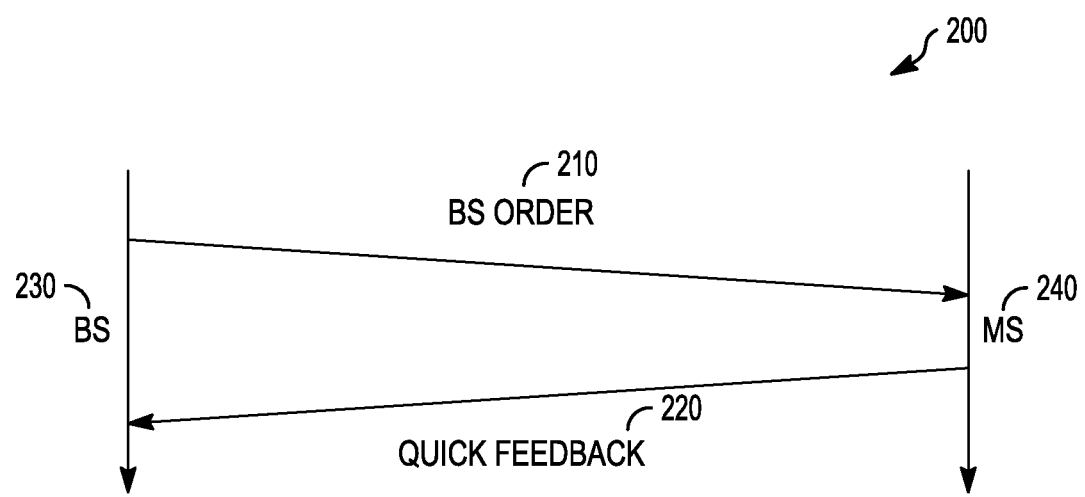
FIG. 2 illustrates a BS ordered quick feedback procedure according to embodiments of the present invention.

Below gives one example of f(m,j,t) to fulfill the design requirement. The final equation is not limited to this as long as the requirement is fulfilled. Assume f(m,j,t)=mod(mod(j,L)+mod(m, L)+mod(floor(m/L)×t, L), L), At the receiver, both the preamble sequence and the messages are successfully detected, such that i) m and ii) j's partial signaling information loaded in message are known through message and iii) p=f(m,j,t) is known through detected sequence index. We can recover mod(j,L) (which is part of j's signaling information loaded in preamble) firstly given m and p=f(m,j,t); combine it with floor(j/L) which is equivalent to the already decoded signaling bits in the message part, and therefore fully recover j. It is noted that there is no dedicated procedure to load one MS to one preamble; it is simply achieved by allocating a unique MAC ID to the MS. The load on every sequence is controllable to the BS. For example, if there are L users per sector in total, the collision can never happen if the BS allocates MAC ID 0 to L−1. The BS may also request one or more MSs to send in feedback using the QACH channel. There is no need to send an MS id since it is known by the BS. Then one bit is needed in the message bits to differentiate quick access and quick feedback. The BS ordered quick feedback procedure is illustrated generally as 200 of FIG. 2 with BS 230 and MS 240 and BS order 210 and quick feedback 220.

The major benefit is coming from that the load of one quick access channel is controllable and predictable. When the load is low, using the quick access channel to send small amount of signaling bits will save PHY resources for data traffic. Further, there may be many BS initiated MS signaling feedbacks. Many of them happen infrequently and can be encoded using a small number of code words. One example is event driven CQI to assist the scheduling for persistent scheduling. Another example could be MS power headroom reporting. When ordering feedback from multiple MSs at the same time, the BS knows beforehand which MS can use which preamble to send quick feedback. So there is no confusing at the BS side on who has sent the ordered quick feedback.

The information element defining for BS ordered quick feedback can be further related to the information element in the BS order.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method of quick access channel information loading in wireless networks, comprising:
   mapping at least one quick access channel to one distributed resource unit of control tiles, said control tiles being spread across consecutive sub-carriers and consecutive OFDMA symbols;
   wherein each control tile and a predetermined number of sub carriers are used to send a bandwidth indicator and a predetermined number of sub carriers are used to send a bandwidth request message; and
   wherein there exist unique orthogonal sequences for said bandwidth indicator and each of said sequences are capable of being selected as a preamble sequence.

2. The method of claim 1, wherein said bandwidth request message is adapted to carry N information bits.

3. The method of claim 1, wherein in total one bandwidth request channel is adapted to carry $L \times 2^N$ unique code words.

4. The method of claim 3, wherein said quick access channel is used for bandwidth request purposes and both MS address and signaling bits are mapped to total available code words.

5. The method of claim 4, wherein said control tiles are three 6×6 control tiles and each of said 6×6 tile spreads across 6 consecutive sub carriers and 6 consecutive OFDMA symbols.

6. The method of claim 5, wherein in each of said 6×6 control tiles, L sub carriers are used to send bandwidth indicators and 17 sub carriers are used to send bandwidth request messages.

7. The method of claim 6, wherein there exist L unique orthogonal sequences for said bandwidth indicator and each of said L sequences are selected as a preamble sequence.

8. The method of claim 1, wherein said wireless network is a wireless network operable to communicate according the IEEE 802.16 standard.

9. The method of claim 1, wherein the framework of information element loading is as follows:
   1) In total M users are loaded to one QACH, M full MAC Ids are $\{Id_0, Id_1, Id_2, \ldots, Id_{M-1}\}$;
   2) One channel has K unique PHY address $\{Ar_0, Ar_1, Ar_2, \ldots, Ar_{K-1}\}$ M≤K;
   3) One channel has L unique orthogonal sequence indexes $\{0, 1, 2, \ldots L-1\}$;
   4) Mapping from MAC Id to PHY address is unique for any given time t, t=0, 1, . . . ; and
   5) At time t, one user can convey one code word out of J code words for signaling, where $J \times K = L \times 2^N$.

10. The method of claim 9, wherein said information loading distributes sequence collision probability equally among all said L sequences and ensures if two MSs select a same sequence for time t, the probability they select the same sequence for time t+1 is low, thereby preventing sequence collision from repeating over time, and if two MSs access a channel at the same time, the chance that both MSs selecting the same sequence is up bounded by 1/L.

11. The method of claim 10, wherein said information loading method is selected from the group consisting of:
   if $J=L \times 2^O$, $K=2^P$, O+P=N, O≥0, P≥0, Load PHY address in message and load signaling bits in preamble and message and if MS m wants to convey signaling code word j at time t, p=f(j, t) is the chosen preamble index, p=0, 1, . . . L−1, f(j, t), P {p=i} is close to 1/L for all users and if for two MSs $m_1$ and $m_2$, $f(j_1, t)=f(j_2, t)$, we should minimize the possibility $f(j_1, t+1)=f(j_2, t+1)$;
   if $J=2^O$, $K=L \times 2^P$, O+P=N, O≥0, P≥0, load PHY address in preamble and message and load signaling bits in message and if MS m wants to convey signaling CW j at time t, p=h(m, t) is the chosen preamble index, where p=0, 1, . . . L−1. h(m, t) has a much easier design compared with method 1 in order to make P {p=i} close to 1/L for all users and if for two users $m_1$ and $m_2$, $h(m_1, t)=h(m_2, t)$, we should minimize the possibility h(m1, t+1)=h(m2, t+1) or
   load PHY address in message and load signaling bits in preamble and message; choose preamble index by both signaling and PHY address, $J=L \times 2^O$, $K=2^P$, O+P=N, O≥0, P≥0, if user m wants to convey signaling CW j at time t, then p=f(m,j,t) is the chosen preamble index, where p=0, 1, . . . L−1. we should design f(m,j,t) to make P {p=i} close to 1/L for all users and if for two users $m_1$ and $m_2$, $f(m_1, j_1, t)=f(m_2, j_2, t)$, we should minimize the possibility $f(m_1, j_1, t+1)=f(m_2, j_2, t+1)$. One example of f(m,j,t) is that f(m,j,t)=mod(mod(j,L)+mod(m, L)+mod (floor(m/L)×t,L), L).

12. An apparatus adapted to provide quick access channel information loading in wireless networks, comprising:
   a transceiver adapted to map at least one quick access channel to one distributed resource unit of control tiles, said control tiles being spread across consecutive sub-carriers and consecutive OFDMA symbols;
   wherein each control tile and a predetermined number of sub carriers are used to send a bandwidth indicator and a predetermined number of sub carriers are used to send a bandwidth request message; and
   wherein there exist unique orthogonal sequences for said bandwidth indicator and each of said sequences are capable of being selected as a preamble sequence.

13. The apparatus of claim 12, wherein said bandwidth request message is adapted to carry N information bits.

14. The apparatus of claim 12, wherein in total one bandwidth request channel is adapted to carry $L \times 2^N$ unique code words.

15. The apparatus of claim 14, wherein said quick access channel is used for bandwidth request purposes and both MS address and signaling bits are mapped to total available code words.

16. The apparatus of claim 15, wherein said control tiles are three 6×6 control tiles and each of said 6×6 tile spreads across 6 consecutive sub carriers and 6 consecutive OFDMA symbols.

17. The apparatus of claim 16, wherein in each of said 6×6 control tiles, L sub carriers are used to send bandwidth indicators and 17 sub carriers are used to send bandwidth request messages.

18. The apparatus of claim 17, wherein there exist L unique orthogonal sequences for said bandwidth indicator and each of said L sequences are selected as a preamble sequence.

19. The apparatus of claim 12, wherein said wireless network is a wireless network operable to communicate according the IEEE 802.16 standard.

20. The apparatus of claim 12, wherein the framework of information element loading is as follows:
   1) In total M users are loaded to one QACH, M full MAC Ids are $\{Id_0, Id_1, Id_2, \ldots, Id_{M-1}\}$;
   2) One channel has K unique PHY address $\{Ar_0, Ar_1, Ar_2, \ldots, Ar_{K-1}\}$ M≤K;
   3) One channel has L unique orthogonal sequence indexes $\{0, 1, 2, \ldots L-1\}$;
   4) Mapping from MAC Id to PHY address is unique for any given time t, t=0, 1, . . . ; and
   5) At time t, one user can convey one CW out of J CW for signaling, $J \times K = L \times 2^N$.

21. The apparatus of claim 20, wherein said information loading distributes sequence collision probability equally among all said L sequences and ensures if two MSs select a same sequence for time t, the probability they select the same sequence for time t+1 is low, thereby preventing sequence collision from repeating over time, and if two MSs access a channel at the same time, the chance that both MSs selecting the same sequence is up bounded by 1/L.

22. The apparatus of claim 21, wherein said information loading method is selected from the group consisting of:
   if $J=L \times 2^O$, $K=2^P$, O+P=N, O≥0, P≥0, Load PHY address in message and load signaling bits in preamble and message and if MS m wants to convey signaling code word j at time t, p=f(j, t) is the chosen preamble index, p=0, 1, . . . L−1, f(j, t), P{p=i} is close to 1/L for all users and if for two MSs $m_1$ and $m_2$, if $f(j_1, t)=f(j_2, t)$, we should minimize the possibility $f(j_1, t+1)=f(j_2, t+1)$;

if $J=2^O$, $K=L\times 2^P$, $O+P=N$, $O\geq 0$, $P\geq 0$, load PHY address in preamble and message and load signaling bits in message and if MS m wants to convey signaling CW j at time t. $p=h(m, t)$ is the chosen preamble index, where $p=0, 1, \ldots L-1$. $h(m, t)$ has a much easier design compared with method 1 in order to make $P\{p=i\}$ close to $1/L$ for all users and if for two users $m_1$ and $m_2$, if $h(m_1, t)=h(m_2, t)$, we should minimize the possibility $h(m1, t+1)=h(m2, t+1)$; or load PHY address in message and load signaling bits in preamble and message; choose preamble index by both signaling and PHY address, $J=L\times 2^O$, $K=2^P$, $O+P=N$, $O\geq 0$, $P\geq 0$, if user m wants to convey signaling CW j at time t. if $p=f(m, j, t)$ is the chosen preamble index, where $p=0, 1, \ldots L-1$. We should design $f(m, j, t)$ to make $P\{p=i\}$ close to $1/L$ for all users and if for two users $m_1$ and $m_2$ that $f(m_1, j_1, t)=f(m_2, j_2, t)$, we should minimize the possibility $f(m_1, j_1, t+1)=f(m_2, j_2, t+1)$. One example of $f(m,j,t)$ is that $f(m,j,t)=\text{mod}(\text{mod}(j, L)+\text{mod}(m, L)+\text{mod}(\text{floor}(m/L)\times t, L), L)$.

23. A machine-accessible medium that provides instructions, which when accessed, cause a machine to perform operations comprising:

controlling quick access channel information loading in wireless networks by mapping at least one quick access channel to one distributed resource unit of control tiles, said control tiles being spread across consecutive sub-carriers and consecutive OFDMA symbols;

wherein each control tile and a predetermined number of sub carriers are used to send a bandwidth indicator and a predetermined number of sub carriers are used to send a bandwidth request message; and wherein there exist unique orthogonal sequences for said bandwidth indicator and each of said sequences are capable of being selected as a preamble sequence.

24. The machine-accessible medium of claim 23, wherein said bandwidth request message is adapted to carry N information bits.

25. The machine-accessible medium of claim 23, wherein in total one bandwidth request channel is adapted to carry $L\times 2^N$ unique code words.

26. The machine-accessible medium of claim 25, wherein said quick access channel is used for bandwidth request purposes and both MS address and signaling bits are mapped to total available code words.

27. The machine-accessible medium of claim 26, wherein said control tiles are three 6×6 control tiles and each of said 6×6 tile spreads across 6 consecutive sub carriers and 6 consecutive OFDMA symbols.

28. The machine-accessible medium of claim 27, wherein in each of said 6×6 control tiles, 19 sub carriers are used to send bandwidth indicators and 17 sub carriers are used to send bandwidth request messages.

* * * * *